United States Patent
Williams

(10) Patent No.: US 8,391,294 B2
(45) Date of Patent: Mar. 5, 2013

(54) METHOD FOR ESTIMATING A SYSTEM STATE IN A NETWORK

(75) Inventor: Mark Lawrence Williams, Bristol (GB)

(73) Assignee: BAE Systems PLC., London (GB)

( * ) Notice: Subject to any disclaimer, the term of this patent is extended or adjusted under 35 U.S.C. 154(b) by 554 days.

(21) Appl. No.: 10/581,791

(22) PCT Filed: Mar. 15, 2006

(86) PCT No.: PCT/GB2006/050055
§ 371 (c)(1),
(2), (4) Date: Jun. 6, 2006

(87) PCT Pub. No.: WO2006/097771
PCT Pub. Date: Sep. 21, 2006

(65) Prior Publication Data
US 2008/0310426 A1    Dec. 18, 2008

(51) Int. Cl.
*H04L 12/28* (2006.01)
(52) U.S. Cl. ....................................................... 370/400
(58) Field of Classification Search .................. 370/400; 342/195; 702/50
See application file for complete search history.

(56) References Cited

U.S. PATENT DOCUMENTS

| | | | | |
|---|---|---|---|---|
| 6,502,042 | B1 * | 12/2002 | Eid et al. .......................... | 702/50 |
| 7,180,443 | B1 * | 2/2007 | Mookerjee et al. ............. | 342/195 |
| 2004/0220769 | A1 * | 11/2004 | Rui et al. ....................... | 702/179 |
| 2005/0226179 | A1 * | 10/2005 | Behroozi ....................... | 370/328 |
| 2008/0310426 | A1 * | 12/2008 | Williams ....................... | 370/400 |

OTHER PUBLICATIONS

LIDS Technical report #2601, "Using Sample-based Representations Under Communications Constraints", Ihler et al., Revised Dec. 2004 accessed from Internet at http://ssg.mit.edu/~ihler/papers/TR2601. pdf pp. 1-17.

Coates M.: "Distributed particle filters for sensor networks" Third International Symposium on Information Processing in Sensor Networks ACM New York, NY, USA, Apr. 26, 2004-Apr. 27, 2004, pp. 99-107, XP002335206 ISBN: 1-58113-846-6.

Van Der Merwe R et al: "Gaussian mixture sigma-point particle filters for sequential probabilistic inference in dynamic state-space models" 2003 IEEE International Conference on Acoustics, Speech, and Signal Processing, Preceedings. (ICASSP). Hong Kong, IEEE, US, vol. 1 of 6, Apr. 6, 2003-Apr. 10, 2003 pp. VI701-VI704, XP10640848.

M Rosencrantz, G. Gordon, S. Thrun: "Decentralized Sensor Fusion with Distributed Particle Filters" Proc. Conf. Uncertainty in Artificial Intelligence, Aug. 7, 2003 XP002335207 Acapulco, Mexico.

(Continued)

*Primary Examiner* — Andrew Lai
*Assistant Examiner* — Leon Andrews
(74) *Attorney, Agent, or Firm* — Buchanan Ingersoll & Rooney PC

(57) ABSTRACT

A method for estimating a system state, in a decentralized network having a plurality of nodes, each node being confined for receiving and sending information, and for processing information. Each node being connected to neighboring nodes of the network. At each node the method includes: (i) maintaining a set of particles and associated weights, which represent an estimate of the system state, (ii) representing the estimated system state as a mixture of Gaussian distributions in a channel filter, and communicating the mixture to neighboring nodes, and (iii) a neighboring node receiving the mixture in a channel filter that contains a similar Gaussian representation of its own estimate of system state, and dividing the incoming mixture by the existing mixture, for updating the estimate of the system state that is maintained at the node.

7 Claims, 3 Drawing Sheets

OTHER PUBLICATIONS

Sidenbladh H: "Multi-target particle filtering for the probability hypothesis density" Information Fusion, 2003. Proceeding of the Sixth International Conference Piscataway, NJ, USA, IEEE, vol. 2, Jul. 8, 2003-Jul. 11, 2003 pp. 800-806, XP010675628 * Chapter 4*.

Tobias M et al: "A probability hypothesis 1-9 density-based multitarget tracker using multiple bistatic range and velocity measurements" System Theory, 2004. Proceedings of the thirty-sixth southeastern symposium on Atlanta, GA, USA Mar. 14-16, 2004, Piscataway, NJ, USA, IEEE, Mar. 14, 2004, pp. 205-209, XP010703817 ISBN: 0-7803-8281-1.

Mararenko A et al: "Decentralized data fusion and control in active sensor networks" Seventh International Conference on Information Fusion Int. Soc. of Information Fusion Mountain View, CA, USA, vol. 1, 2004, pp. 479-486 vol. 1, XP002335208 ISBN: 91-7056-115-X * Chapter 3*.

Kotecha J H et al. "Gaussian sum particle filtering" IEEE Transactions on Signal Processing IEEE USA, vol. 51, No. 10, Oct. 2003, pp. 2602-2612, XP002335209 ISSN: 1053-587X *abstract*.

Arulampalam M S et al: "A tutorial on particle filters for online nonlinear/non-Gaussian Bayesian tracking" IEEE Transactions on signal processing IEEE USA, vol. 50, No. 2, Feb. 2002, pp. 174-188, XP002335210 ISSN: 1053-587X *the whole document*.

International Preliminary Report on Patentability issued in PCT/GB2006/050055, Mar. 14, 2007, EPO, Munich, DE.

* cited by examiner $\{X_{k-1}^{(i)}, \omega_{k-1}^{(i)}\} \sim p(X_{k-1}|Y_{1:k-1})$
=resampling $\{\tilde{X}_{k-1}^{(i)}, 1/N\} \sim p(X_{k-1}|Y_{1:k-1})$
=prediction $\{X_k^{(i)}, 1/N\} \sim p(X_k|Y_{1:k-1})$
=measurement & update $\{X_k^{(i)}, \omega_k^{(i)}\} \sim p(X_k|Y_{1:k})$

METHOD FOR ESTIMATING A SYSTEM STATE IN A NETWORK

TECHNICAL FIELD

This invention relates to a method and means for processing information across a network, the network comprising a plurality of nodes. Each node has means for receiving and sending information and means for processing information. The invention is particularly concerned with such a network that implements a so-called particle filter.

BACKGROUND ART

The particle filtering technique is known, see Arulampalam, IEEE Transactions on Signal Processing Vol. 50, No. 2, February 2002, pp 174188 "A Tutorial on Particle Filters for Online Nonlinear/Non-Gaussian Bayesian Tracking"

A particle filter algorithm may be summarised as including the following key steps:
1. A set of particles are maintained that are candidate representatives of a system state. A weight is assigned to each particle, and an estimate of the state is obtained by the weighted sum of the particles (a non-analytic probability distribution function (pdf)).
2. A recursive operation is carried out that has two phases: prediction and update.
3. For prediction, at time t=k, the pdf is known at the previous time instant t=k−1. A system model is used to predict the state at time t=k
4. For update, at time t=k, a measurement of the system becomes available, which is used to update the pdf that was calculated in the prediction phase. During update, the particles may be resampled to remove particles with small weight.
5. return to 3.

An objective of particle filtering may be to track a variable of interest as it evolves over time, for example the state of an aircraft, by means of a series of observations with a number of sensors. The observations typically have a non-Gaussian measurement function. The technique is a sequential Monte Carlo method, in which a set of state trajectories (or particles) are maintained that are candidate representatives of a system state. When a new observation is made, each trajectory is extended and weights are assigned to each particle according to the likelihood of the state it represents given the measurement. A new particle population is generated to replace the old one by resampling from the old particle population in proportion to the weights.

Algorithms for solving problems over a network fall into three classes:

Centralised algorithms: Centralised algorithms require that all data be sent to a single node. The processing occurs at that node and the assignment solution is sent out to all nodes. Centralised algorithms are not robust and do not scale well with network size. They are not robust since the removal of the central node causes complete failure. They do not scale well as the number of messages that must be sent down a given link will tend to grow with network size (or the number of links to the central node will grow).

Distributed algorithms: Distributed algorithms require that all data be sent to all nodes. Each node is then able to process the data to arrive at the optimal solution. Distributed algorithms are robust, but not scaleable.

Decentralised algorithms: This applies to networks wherein each node is connected for receiving or transmitting information to selected other nodes of the network, usually neighbouring nodes. Decentralised algorithms include data fusion (for the purposes of this specification, data fusion is intended to mean processing of information) at each node before information is passed on to connected nodes. This allows some of the processing necessary to reach an optimal answer at a particular node, to be carried out at neighbouring nodes, and avoids the requirement that all data be sent to all nodes. Decentralised algorithms are robust and scaleable. A decentralised network has the following properties:
1. There is no single central decision centre; no one node should be central to the successful operation of the network.
2. Nodes do not have any global knowledge of network topology, or size;
   nodes should only know about connections in their own neighborhood.

There are published methods for decentralising the particle filter, where data processing is carried out locally at selected nodes of a network of nodes, each node corresponding for example to a sensor. The results of the data processing are exchanged between neighbouring nodes. The decentralised methods published in the literature, achieve decentralization through a compact representation of the particle filter's particle population; see:

M. Rosencrantz, G. Gordon, S. Thrun, "Decentralized Sensor Fusion With Distributed Particle Filters", Proceedings of the 19th Annual Conference on Uncertainty in Artificial Intelligence (UAI-03), Morgan Kaufmann Publishers, San Francisco, Calif., 2003, pp 493-500 M. Coates, "Distributed Particle Filters For Sensor Networks", Information Processing In Sensor Networks Proceedings of the third international symposium on Information processing in sensor networks, Berkeley, Calif., USA, 2004, pp 99-107

The problem with these published methods is that they do not provide a robust representation, that there is no quantitative measure of the quality of the representation achieved, and that the representations do not lend themselves well to inclusion in a decentralized tracking scheme.

The use of a mixture of Gaussian distributions as a compact representation for a non-Gaussian probability distribution in decentralised tracking is described in S. Kumar and B. Upcroft, "ANSWER II Interim Progress Report: Algorithmic Design" Department of Aerospace, Mechatronic and Mechanical Engineering, University of Sydney, July 2004. This work makes no mention of application to particle filtering, and involves the assimilation of multiple Gaussian mixture distributions that is identified as a drawback with large computational requirements.

SUMMARY OF INVENTION

In one aspect the present invention provides a network for estimating a system state, the network comprising a plurality of nodes, each node having means for receiving and sending information and means for processing information, and each node being connected to selected other nodes of the network, each node including:
  particle filter means for maintaining a set of particles and associated weights, which represent an estimate of the system state, and means for updating the set when new information is available,
  means for representing the estimated system state as a mixture of Gaussian distributions, and means for communicating said mixture to neighbouring nodes,
  said means for updating, being responsive to receiving said mixture from a neighbouring node to update its estimate of the system state.

In a further aspect the present invention provides a method for estimating a system state that is applied in a network comprising a plurality of nodes, each node having means for receiving and sending information and means for processing information, and each node being connected to selected other nodes of the network, the method comprising, at each node:
(i) maintaining a set of particles and associated weights, which represent an estimate of the system state,
(ii) representing the estimated system state as a mixture of Gaussian distributions, and communicating said mixture to neighbouring nodes, and
(iii) in response to receiving said mixture from a neighbouring node, updating the estimate of the system state that is maintained at the node.

In at least a preferred embodiment of the invention, an algorithm requires that the local particle population be used to generate a Gaussian mixture approximation. The incoming and local PDFs are then evaluated at each particle position, divided, and applied as a weight to the particles. In order to achieve decentralised filtering each sensor node must send its tracks to its neighbours. The receiving node must then update its own tracks using the new information in the incoming tracks before sending out its own tracks. The network is assumed to be tree-structured and channel filters are established such that the new information can be calculated by dividing the local track PDF by the incoming track PDF. It follows that new information need only be calculated at the discrete positions of the particle population to be updated.

BRIEF DESCRIPTION OF THE DRAWINGS

A preferred embodiment of the invention will now be described with reference to the accompanying drawings, wherein.

DESCRIPTION OF THE PREFERRED EMBODIMENT

Figure 1:
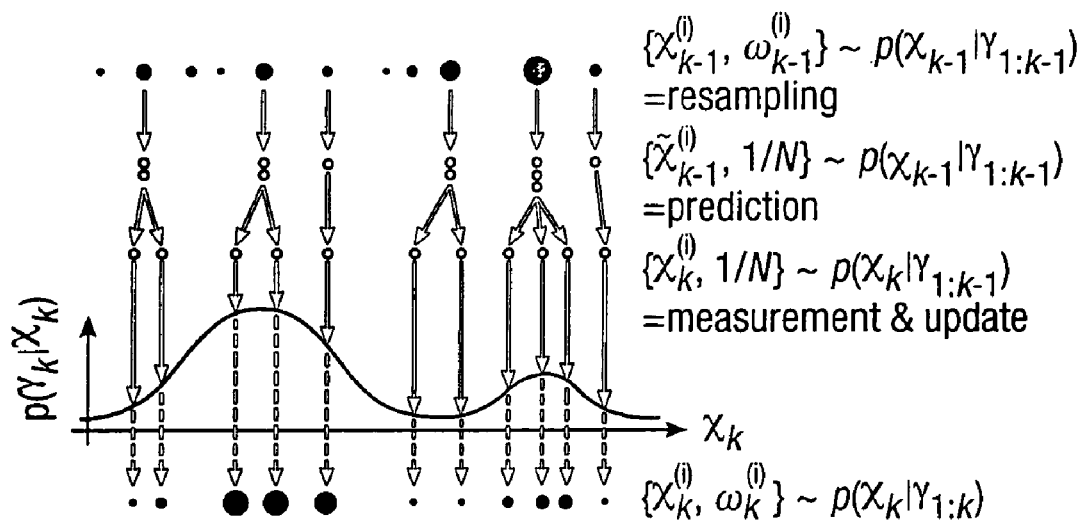
FIG. 1 is a schematic representation of a particle filter algorithm for use in the present invention.

Particle filtering is a powerful non-linear and non-Gaussian method for tracking. Its power comes from its representation of the target in state-space. It achieves this representation through a population of particles. It is highly desirable to be able to run particle filtering in a decentralised manner across a network. In order to do this a compact representation of the particle population is required, as sending the entire population is not feasible. One also requires a means of making the information update from one particle population to another in a neighbouring node. The individual particles are not of direct use in this regard as they encode the probability distribution in their population statistics rather than individually.

The present invention achieves a compact representation of the particle population by approximating the distribution with a mixture of Gaussians. The mixture of Gaussian representation, applied to populations and then indexed using particles of the population to be updated, provides an efficient means of making the information update required in distributed tracking. The mixture of Gaussians representation also provides a means of representing a particle population that requires a specific amount of bandwidth and can be adjusted according to requirements. No training is required.

The novel elements of this approach are that it employs a well-understood and general representation (Gaussian mixture model) and allows a compact representation of the particle population to be exchanged. Moreover the form of the representation lends itself to an efficient information-based update of the receiving node's state-space. The update can be made immediately, no consensus across the nodes being required. The representation also allows easy checks for consistency, such that one can pass a more accurate representation (using more Gaussian kernels) if the bandwidth is available and a particular particle population requires it. The particle filter is well known. The simplest form is as follows. Particle filtering is a tractable solution to the general problem of Bayesian filtering:

$$\text{Predict:} p(\lambda_k|\gamma_{1:k-1}) = \int p(\lambda_k|\lambda_{k-1}) p(\lambda_{k-1}|\gamma_{1:k-1}) d\lambda_{k-1}$$

$$\text{Update:} p(\lambda_k|\gamma_{1:k}) \propto p(\gamma_k|\lambda_k) p(\lambda_k|\gamma_{1:k-1})$$

Where $p(\gamma_k|\lambda_k)$ is the likelihood function (measured PDF) k is the index for the time-step, $\lambda$ is the system state, and y is the measurement set. If one assumes the likelihood functions are Gaussian and the measurement/motion models are linear, these equations become analytically tractable and one has the Kalman filter. More generally the equations cannot be solved analytically.

If we represent our probability distributions by populations of points then we can solve these equations as summations without any assumptions of linearity and Gaussianity, but the solution is only strictly correct in the limit of infinite summations/points.

Assumption: a set of N state samples and corresponding weights $\{\lambda_{k-1}^{(i)}, \omega_{k-1}^{(i)}, i=1, \ldots, N\}$ represents the posterior density $p(\lambda_{k-1}|\gamma_{1:k-1})$ at time k−1.

Procedure: update the particle set to represent the posterior density $p(\lambda_k|\gamma_{1:k})$ for current time k according to following iterations where $\tilde{\lambda}$ is the resampled state representation (all weights equal).

Referring to FIG. 1, the following steps take place:

a. The current system state, at the top of the diagram is:

$$\{\lambda_{k-1}^{(i)}, \omega_{k-1}^{(i)}\} \sim p(\lambda_{k-1}|\gamma_{1:k-1})$$

b. Resampling, represented in the second line of the diagram:

$$\left\{ \tilde{\chi}_{k-1}^{(i)}, 1/N \right\} \sim p(\chi_{k-1}|\gamma_{1:k-1})$$

c. The prediction stage, the third line of the diagram:

$$\{\lambda_k^{(i)}, 1/N\} \sim p(\lambda_k|\gamma_{1:k-1})$$

d. The measurement and update phase where new weights are assigned, the final line of the diagram:

$$\{\lambda_k^{(i)}, \omega_k^{(i)}\} \sim p(\lambda_k|\gamma_{1:k})$$

Figure 2:
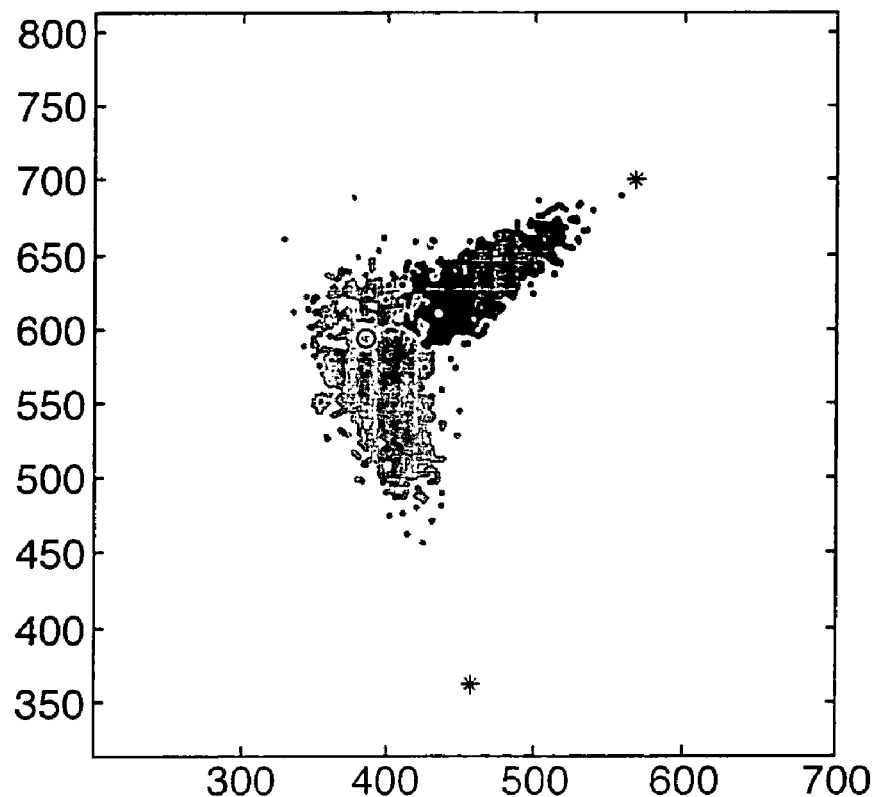
FIG. 2 is a representation of particle filtering from two separate unconnected sensor nodes.
Figure 3:
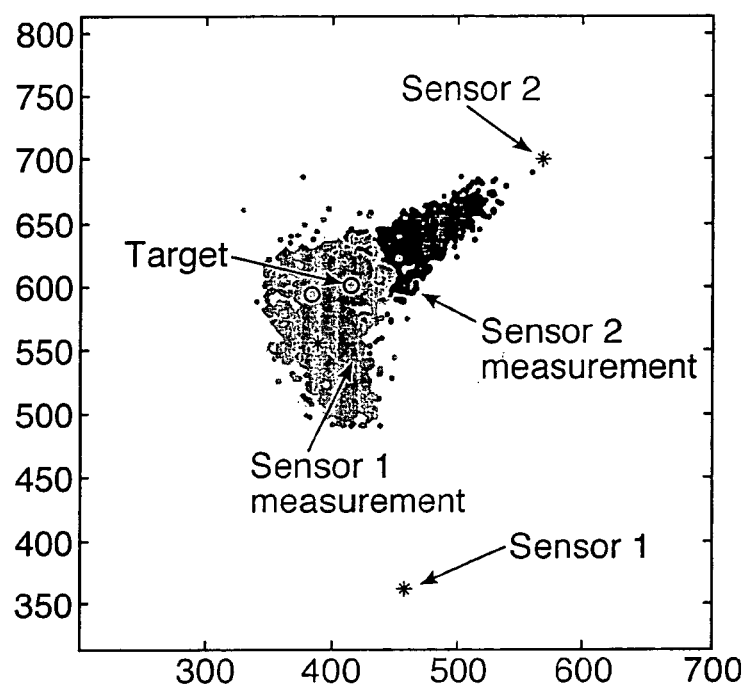
FIG. 3 is a representation of the particle filtering of FIG. 1, but where the sensor nodes are connected in a centralised network.

In FIG. 2 two particle populations are shown. The populations, represent the probability distribution function (PDF) for the target over the state space (2-D space and 2-D velocity, only 2-D space show in image), based on the separate measurements from each of the two sensors shown. The sensors give noisy measures of range and bearing. In FIG. 3 a third population is shown. This represents the population based on centralised particle filtering where the measurements from both sensors are applied to the same particle population at some central node. It can be seen that, by using both sets of measurements, better localisation is achieved.

In order to achieve decentralised filtering each sensor node must send its tracks to its neighbours. The receiving node must then update its own tracks using the new information in the incoming tracks before sending out its own tracks. In the present invention the network is tree-structured, by which is meant is does not include loops, and channel filters are established such that the new information can be calculated by dividing the local track PDF by the incoming track PDF.

The new information need only be calculated at the discrete positions of the particle population to be updated. The algorithm requires that the local particle population be used to generate a Gaussian mixture approximation. The incoming and local PDFs are then evaluated at each particle position, divided, and applied as a weight to the particles.

Figure 4:
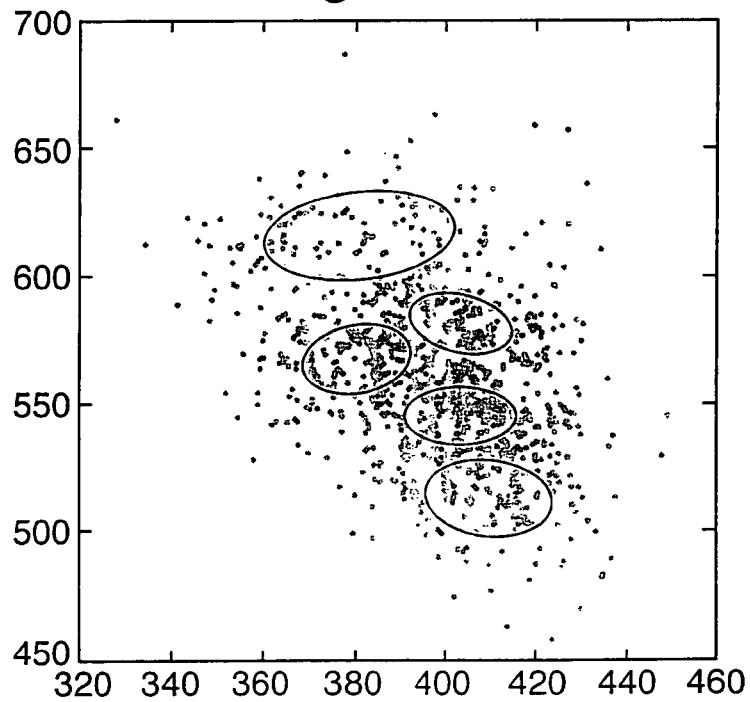
FIG. 4 is a diagrammatic view of a Gaussian mixture representation of a particle population.

FIG. 4 shows a five-kernel Gaussian mixture representation of the particle distribution for sensor 1. The population of 1000 particles in four degrees of freedom is now represented by five four-dimensional vectors of means and covariances.

Figure 5:
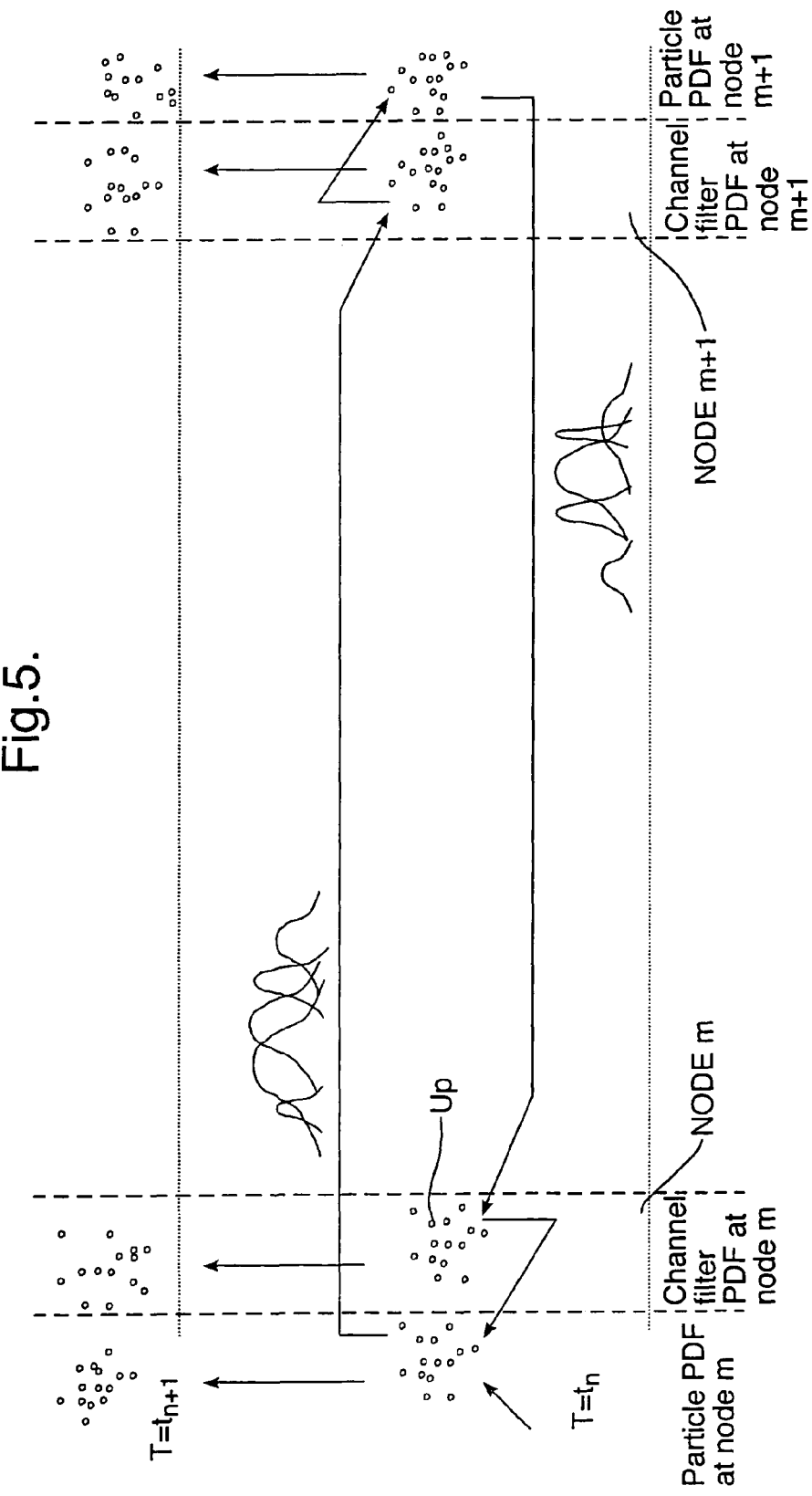
FIG. 5 is a schematic view of a decentralised network comprising two sensor nodes that implement the preferred embodiment of the present invention.

FIG. 5 is a schematic view of a decentralised network comprising two sensor nodes, m and m+1. The arrows indicate the sequence of operations. Each node is represented by a first column that indicates schematically the particle PDF held at the node, and a second column indicates the Channel filter for the node, with Channel filter PDF indicated schematically. The channel filters are connected across a communication link that is indicated by the horizontally extending arrows. The vertical direction represents a time axis.

Specifically, in an initial step, the population PDF maintained in node m+1, is used to generate in the channel filter of node m+1, a compact representation of the population as a mixture of Gaussian representations, for time $T=t_{n-1}$. These are transmitted (schematically indicated) across the communication link to the channel filter for node m. Each Gaussian distribution of the mixture is transmitted as signals representing the mean and covariance of the distribution; thus only a minimal amount of information is required to be transmitted.

The step labelled 'Up' is the update of the local particle population at node m ($P_m$) using the channel filter (a particle population updated from $T=t_{n-1}$) and the incoming compact representation (a mixture of Gaussians from node m+1). The incoming Gaussian mixture is $$P_{G,m+1} = \sum_{i=1:N} G^{m+1}_{\mu_i,\sigma_i}$$

where number N is the number of Gaussian kernels (mean μ, covariance σ) chosen to represent the parent distribution represented by the particle density.

The particle population maintained in the channel filter receiving from node m+1 at node m is used to generate a Gaussian mixture representation $P_{G,m}^{ch}$. Particle population $P_m$ is updated with the new information from node m by weighting and resampling the particles. The weight, $w_{i,m}$, for the i-th particle, $p_{i,m}$, in $P_m$ is given by, $$w_{i,m} = \frac{\sum_{k=1:N} G^{m+1}_{\mu_k,\sigma_k}(p_{i,m})}{\sum_{k=1:N} G^{ch,m}_{\mu_k,\sigma_k}(p_{i,m})}$$

Further prediction and update steps may take place in node m as a result of measurements received from associated sensors etc.

In a following step, a compact representation of the population existing in node m, is transmitted as a compact Gaussian mixture representation to node m+1, in a similar manner to that described above.

The method described has been implemented across a tree-structured sensor network using channel filters.

The method may be extended to general networks, using known solutions to the conservative combination of Gaussian mixtures Conservative methods such as covariance guarantee that the estimated covariance will not be smaller than the true covariance.]

Tests have been run of the two sensor node embodiment shown in FIG. 5, and the results show that little information is lost through use of the compact representation, and that the method is stable. The results show a good level of consistency.

The invention claimed is:

1. A method for estimating a system state that is applied in a network comprising a plurality of nodes, each node having means for receiving and sending information and means for processing information, and each node being connected to selected other nodes of the network, the method comprising, at each node:
    (i) maintaining a set of particles and associated weights, which represent an estimate of the system state,
    (ii) representing the estimated system state as a mixture of Gaussian distributions, and communicating said mixture to neighbouring nodes, and
    (iii) in response to receiving said mixture from a neighbouring node, updating the estimate of the system state that is maintained at the node by resampling the particles to provide new weights for each particle, wherein each new weight includes said mixture of Gaussian distributions received from a neighbouring node divided by said mixture of Gaussian distributions formed from the existing particle set in the node.

2. The method according to claim 1, wherein each Gaussian distribution of said mixture is transmitted as signals representing the mean and covariance of the distribution.

3. The method as claimed in claim 1, including providing channel filters at each port of each node, in which updated weights for each particle are determined.

4. A network for estimating a system state, the network comprising a plurality of nodes, each node having means for receiving and sending information and means for processing information, and each node being connected to selected other nodes of the network, each node including:
    particle filter means for maintaining a set of particles and associated weights, which represent an estimate of the system state, and means for updating the set when new information is available, means for representing the estimating system state as a mixture of Gaussian distributions, and means for communicating said mixture to neighbouring nodes, said means for updating, being responsive to receiving said mixture from a neighbouring node, for updating its estimate of the system state by computing new weights for each particle using a resampling operation, wherein each new weight includes said mixture of Gaussian distributions communicated to the node divided by said mixture of Gaussian distributions representing the existing particle set at said node.

5. The network as claimed in claim 4, wherein a communication port of each node includes a channel filter.

6. The network as claimed in claim 4, wherein said means for communicating transmits each Gaussian distribution of said mixture as signals representing the mean and covariance of the distribution.

7. The network as claimed in claim 4, wherein each node is a sensor for tracking aircraft.

* * * * *